United States Patent [19]

Batts

[11] 4,291,434
[45] Sep. 29, 1981

[54] TENDON PULLING

[75] Inventor: Tom Batts, Rose Hill, N.C.

[73] Assignee: Swift & Company, Chicago, Ill.

[21] Appl. No.: 782,171

[22] Filed: Mar. 28, 1977

[51] Int. Cl.³ ............................................. A22C 21/00
[52] U.S. Cl. ........................................ 17/11.3; 17/11
[58] Field of Search ...................... 17/11, 11.1, 45, 52, 17/11.3

[56] References Cited

U.S. PATENT DOCUMENTS

| | | | |
|---|---|---|---|
| 2,790,200 | 4/1957 | Zebarth | 17/11.3 |
| 2,836,845 | 6/1958 | Farchmin et al. | 17/11.3 |
| 3,038,197 | 6/1962 | Turner | 17/11 |
| 3,056,161 | 10/1962 | Zebarth | 17/11 |
| 3,323,164 | 6/1967 | Bonuchi et al. | 17/11 |
| 3,405,423 | 10/1968 | Vertegnac | 17/11 |
| 3,522,623 | 8/1970 | Pyron | 17/11 |
| 3,548,448 | 12/1970 | Vertegaal | 17/11 |
| 3,555,593 | 1/1971 | Scheier | 17/11 |
| 3,755,854 | 9/1973 | Van Mil | 17/11 |

Primary Examiner—Paul J. Hirsch
Attorney, Agent, or Firm—Charles E. Bouton

[57] ABSTRACT

Poultry carcasses suspended from the feet are carried along a straight path through a first zone where the lower legs are broken at a given level, and then through a second zone whereat opposing shearing forces are applied above and below the said level whereby to tear the skin and pull tendons from the upper legs of the carcasses.

9 Claims, 3 Drawing Figures

TENDON PULLING

This invention relates to an improved method and apparatus for removing the feet and tendons of poultry. More specifically the present invention is an improved method and apparatus applicable to a straight path continuous processing line utilizing shearing forces to break the lower legs of poultry carcasses and to separate the feet and pull tendons from the upper legs.

There are a number of devices presently used for breaking the feet and pulling tendons from the legs of poultry carcasses. This procedure is highly desirable with the larger mature fowls, such as turkeys, since the tendons are quite tough and unpleasant to the ultimate consumer. However, the procedures and apparatus known heretofore are subject to a number of disadvantages. For instance U.S. Pat. No. 2,790,200 to Zebarth describes an apparatus comprising a drum or rotor which revolves to carry a plurality of hammer-puller members past a fixed anvil, whereby to shear poultry legs and pull tendons. However, an operator must position and manually hold each successive carcass. This apparatus has the disadvantage of requiring manual manipulation of each carcass, and consequently exposes the operator to the risk of injury by the moving machine parts.

Another apparatus is shown in U.S. Pat. No. 2,836,845 to Farchmin et al wherein each carcass is individually positioned to one side of a fixed anvil and the feet are extended through a second movable anvil which is powered to first break the legs and then pull substantially longitudinally to separate the leg and pull the tendons. Although the operator appears to be exposed to less risk with the latter machine, each carcass must be separately handled and removed from a processing line.

More recently U.S. Pat. No. 3,755,854 to Van Mil describes apparatus which is adaptable to continuously operate on a poultry processing line, but is limited in application to a point where the processing conveyor is trained about a 90°–180° turn and possibly depends on the conveyor for its power. According to this apparatus the legs of successive carcasses, hanging by the feet from shackles, are received in recesses on a first revolving disk located at the conveyor turn. A leg breaking wheel is positioned beneath the disk near the point of entry of the carcasses; and a second disk with recesses to receive the legs below the feet is positioned at a declining angle from about the same point. The two disks rotate together, and as the space therebetween increases, after the legs are broken, the feet and tendons are pulled substantially longitudinally and separated from the legs. The major deficiency of this apparatus is that it can only be installed at corners in the conveyor path and is not adaptable to straight line processing.

Accordingly, it is a principal object of the present invention to provide an improved method and apparatus for automatically separating the feet from poultry carcasses and pulling a substantial number of tendons therewith.

Another object of the present invention is to provide an improved method and apparatus for automatically breaking the legs and pulling the tendons of poultry carcasses while the carcasses are carried along a straight path.

Briefly, the present invention provides for the carrying of successive poultry carcasses suspended by the feet from shackles secured to an overhead conveyor, or the like. Each carcass is advanced along a straight path into the bight of two counter-rotating cam plates which are positioned in two slightly spaced parallel planes with the operative peripheries thereof overlapped along said path at a level slightly below said poultry feet. The metatarsus bone and surrounding flesh and skin will thereby be separated and torn apart, and many of the tendons will remain attached to the foot portion and be pulled from the upper legs. It is preferred that the metatarsus bones be broken at about said level at a point on the path prior to reaching the cam plates; and it is also preferred that the cam plates be provided with notches to positively receive and advance the carcass legs.

Further objects and advantages will become apparent upon reading the following detailed description in conjunction with the drawings, wherein.

The preferred embodiment of the present method is performed upon turkey carcasses 10 as they are carried along a processing line generally 12 (in the direction of arrow "A") where they may have previously been defeathered, dressed and/or eviscerated. The carcasses (one shown in FIG. 1) are carried by the feet, with the body freely suspended neck downwardly, from shackles 14 which are, in turn, secured at regular intervals to a continuously moving overhead conveyor chain 16. It will be seen that each of the successive carcasses will be held with the feet at a specific vertical height so that the shank or metatarsus bones (the bone between the foot and the next joint) of carcasses within a fairly broad weight range will fall across a given level or horizontal plane. The metatarsus bones are broken at about that level as each carcass moves through a first zone, but the breaking is conducted so as to not sever the legs.

Thence, the carcasses are each successively advanced, while holding the feet, through a second zone whereat spaced, opposing shearing forces are applied to the two broken parts of the metatarsus bones both slightly above and slightly below said level. The shearing forces will tear and sever the poultry skin and a small amount of flesh at the point where each bone was broken. This shearing action will not, however, cut many of the tendons extending along the leg as the tendons are tough and flexible and the shearing forces are spaced slightly. As a result the tendons are pulled with the feet and are caused to break at points within the upper leg toward the body and thence pulled from the tendon sheaths. At this point in the second zone the bodies of the poultry carcasses fall free and are collected beneath the zone while the feet and tendons are carried further on the shackles 14.

Figure 1:
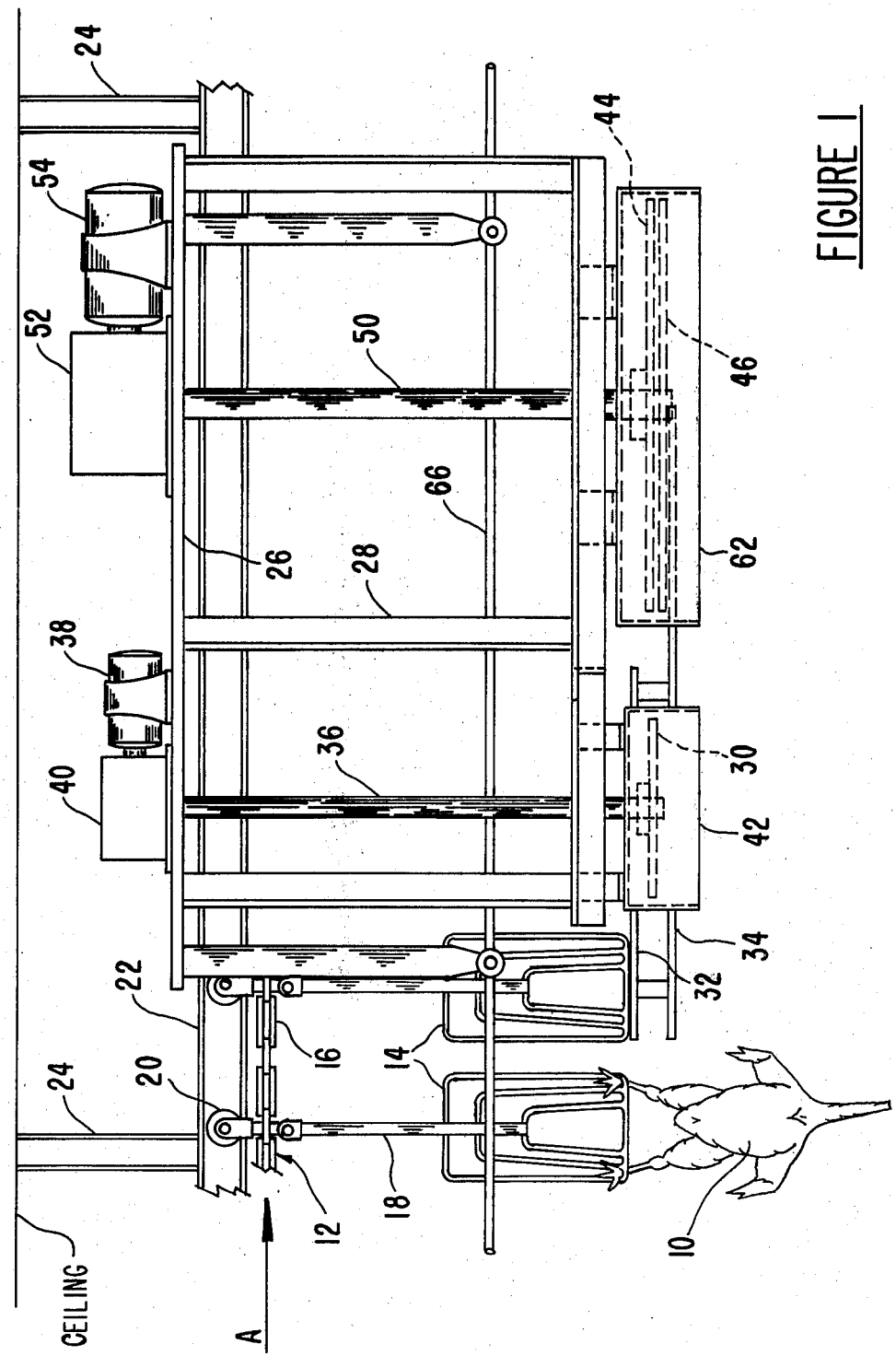
FIG. 1 is a side elevation view of a preferred embodiment of the present invention.
Figure 2:
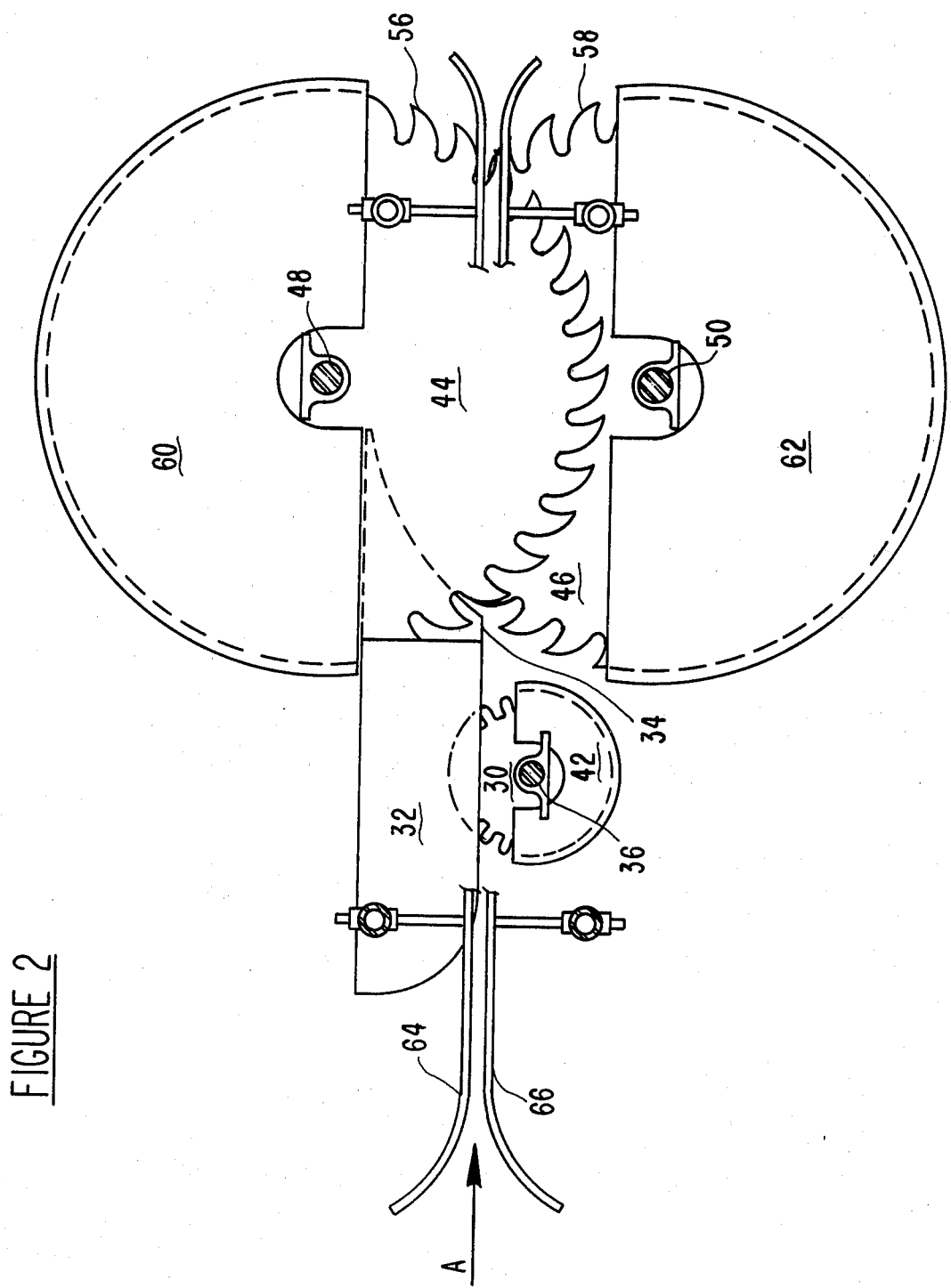
FIG. 2 is a plain view, with certain overhead parts removed or broken away for clarity, showing the operative parts of the apparatus shown in FIG. 1.
Figure 3:
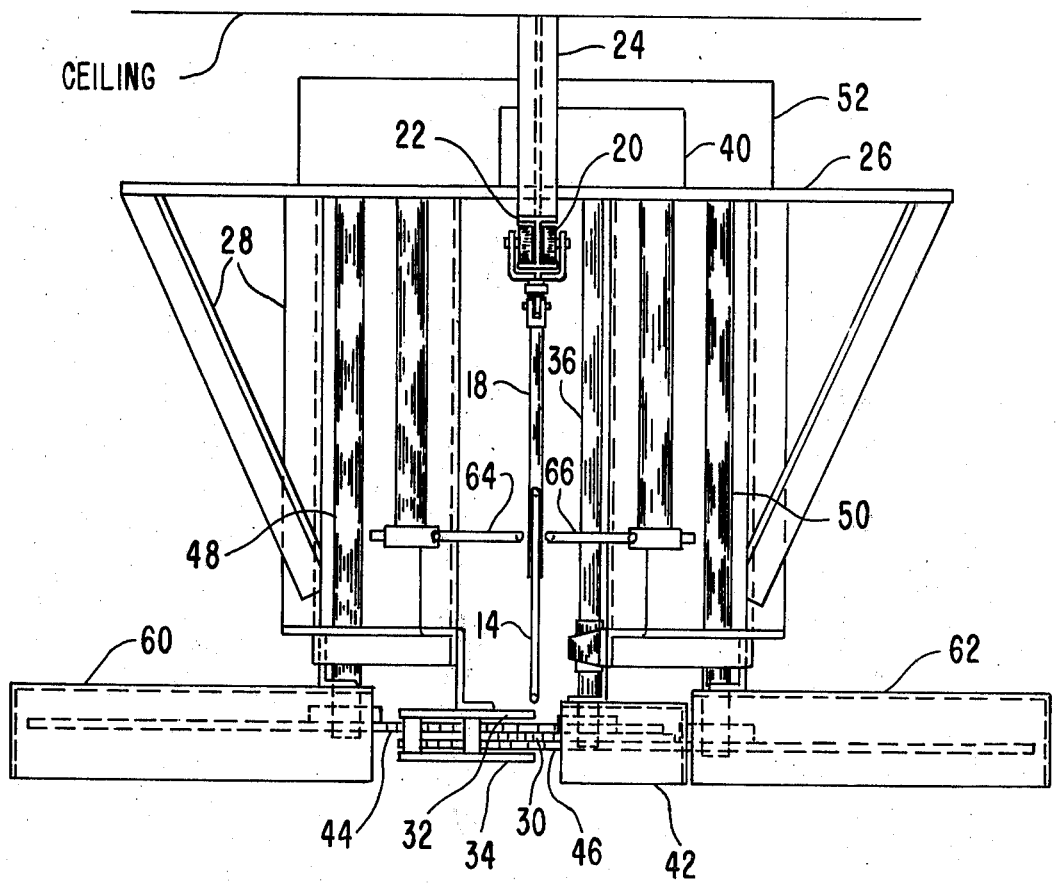
FIG. 3 is a end elevation view taken at the infeed end of the apparatus (from the left) in FIG. 1.

The apparatus may be seen in full detail in FIGS. 1 through 3. The processing line generally 12 comprises a plurality of poultry shackles 14 carried at the lower ends of rods 18 which in turn depend from roller carriages 20, and are connected to the conveyor chain 16. The roller carriages 20 ride on the lower web of an "I" beam overhead rail 22 that is suspended by hangers 24 from the ceiling. The foregoing structure is well known in the art.

The present invention adds to the foregoing processing line generally 12 an overhead frame 26 from which the operating elements are suspended and braced by a plurality of struts 28, and the like. All of the operating elements are located just slightly below the lowermost portions of the shackles 14. The first operative element is a leg breaker wheel 30 (preferably in the general form of a sprocket) which is positioned in a horizontal plane perpendicular and to one side of the shackles 14 with a portion of the wheel periphery extending beyond the opposite side of the shackles 14. Along the opposite side and just beneath the shackles are a pair of spaced anvil plates 32, 34 positioned to receive the extending portion of the breaker wheel 30 therebetween.

The breaker wheel 30 is mounted directly on a vertical drive shaft 36 extending from the overhead frame 26 where it is operatively attached to a drive motor 38 by a gear reducer 40. An enclosure (not shown) such as a hollow pipe or cylinder may be placed around the drive shaft 36 if desired for sanitation and/or safety purposes. Such an enclosure may also serve as part of the frame. The peripheral speed and direction of motion of the breaker wheel 30 should be approximately the same as the linear speed of the processing line. The breaker wheel 30 is preferably partly enclosed by a shroud 42 held in position by struts 28. It will be understood that the carcass legs extending across the anvils 32, 34 will be engaged and broken by the breaker wheel 30.

As the shackles 14 move beyond the breaker wheel 30 they carry carcasses into a second zone where a pair of substantially circular shearing cams 44, 46 are located. The shearing cams 44, 46 are rotatably mounted in planes perpendicular to the shackles, on axes to each side of the shackle path, and are spaced about $\frac{3}{8}$ inch to $\frac{7}{8}$ inch from one another and are positioned slightly above and below, respectively, the level of the breaker wheel 30 so as to engage the metatarsus bones both above and below the breaks therein. Each shearing cam 44, 46 is mounted on a shaft 48, 50, respectively, and is drivingly connected by gearing 52 to a motor 54 so as to rotate opposite to one another, with the peripheral direction of motion being the same as the processing line 12 and at a peripheral speed slightly exceeding the speed of the processing line. The shearing cams 44, 46 are of a relatively large diameter (as compared to the breaker wheel 30) and overlap directly beneath the shackle path. The drive shafts 48, 50 may also be enclosed (not shown).

Preferably each shearing cam 44, 46 has a continuous succession of evenly spaced fingers 56, 58, and intervening notches, which are angled slightly from the radii in the direction of rotation. Such fingers 56, 58 tend to positively engage the legs of carcasses suspended from shackles 14 and advance same between the cams 44, 46. Also it is preferred to enclose the outer portions of the cams 44, 46 with shrouds 60, 62, respectively which are also held in place by the struts 28.

It is further preferred that the shearing cams 44, 46 be overlapped to the maximum possible extent, which may approach their radial measure. The amount of overlap will affect, to a large degree, the duration and magnitude of separation and tension applied to the tendons which may stretch before becoming separated from the upper leg portions. Further, it is preferred, as may be seen in FIGS. 1 and 2 to extend the lower anvil plate 34 directly toward the bight of cams 44, 46 and even under the cam 44 where it is arcuately relieved so as to not interfere with the lower cam 46. The extension of the lower anvil plate assists in stabilizing the carcasses and feeding them accurately to the shearing cams 44, 46.

To further stabilize and guide the poultry carcasses, a pair of horizontal spaced guide rods 64, 66 are mounted between the rail 22 and the breaker wheel 30 and shearing cams 44, 46. The guide rods 64, 66 are positioned to confine the path and orientation of the shackles 14 and thereby cause the suspended carcasses to be properly presented to the breaker wheel 30.

It should also be understood that the apparatus of the invention is to be constructed of materials that will wear well and withstand compressive forces such as steel. Preferably stainless steel is used, at least for the breaker wheel 30 and shearing cams 44, 46, because it is readily sanitized and resists corrosion. Furthermore, motors 38, 54 may be of any suitable type such as hydraulic or electric although electric motors are preferred because of their available power. Other drive means may be provided however; and if the processing line is subject to speed variations, then a variable speed motor and/or gear drive should be provided.

Operation of the apparatus will have become apparent from the foregoing detailed description. Power requirements for pulling tendons will not overload the processing conveyor. The poultry carcasses will automatically fall downwardly beneath the shearing cams 44, 46 when the tendons have been released, and accordingly appropriate equipment known to the art (not shown) is positioned therebelow to receive the carcasses and the carcasses may then be further processed. Also poultry feet, with attached tendons, will remain hanging from the shackles 14 as they pass beyond the cams 44, 46, and appropriate equipment (also not shown but known to the art) will be positioned downstream thereof to remove the feet from the shackles 14 and to clean the shackles.

Obviously many modifications and variations of the invention as hereinbefore set forth may be made without departing from the spirit and scope thereof, and therefore, only such limitations should be imposed as are indicated in the appended claims.

I claim:

1. An improved method for pulling tendons from the legs of poultry carcasses, said method comprising: carrying poultry carcasses by the feet thereof along a straight path; breaking the lower legs of said carcasses while being carried at a given level without appreciably tearing the skin or separating the feet therefrom; thereafter applying oppositely directed shearing forces to said lower legs slightly spaced both above and below said level while said carcasses are so carried; and continuing said shearing forces sufficently to tear the skin at each lower leg to sever each foot and to pull tendons from each upper leg of said carcasses.

2. The method of claim 1 wherein the poultry carcasses are carried neck downwardly along a straight horizontal path with the feet thereof supported in a succession of shackles.

3. The method of claim 1 wherein the shearing forces are applied by a pair of counter rotating overlapping cams.

4. An improved apparatus for pulling tendons from the legs of poultry carcasses, said apparatus comprising: conveyor means for transporting a succession of poultry carcasses in a given direction along a straight path, said conveyor means including poultry foot engaging means; leg breaking means located along said path at a given level beneath said foot engaging means; and a pair of rotatable overlapped shearing means positioned at opposite sides of said path beyond said leg breaking means in said direction and spaced just above and below said level to contact the lower leg portions of said carcasses and to thereby tear the skin at the lower legs, sever the feet and pull tendons from the upper legs of each carcass.

5. An improved apparatus according to claim 4 wherein said foot engaging means are shackles, and said shearing means are a pair of overlapping circular cams which are rotatable in two planes slightly spaced above and below said level and said planes are substantially perpendicular to said shackles.

6. An apparatus according to claim 5 wherein each of said cams has an endless succession of evenly spaced fingers and notches on the outer periphery thereof.

7. The apparatus of claim 8 wherein said fingers are angled in the direction of rotation.

8. An apparatus according to claim 5 wherein said leg breaking means is in the form of a rotatable wheel mounted to one side and extending across said path at said level and between a pair of fixed anvil plates, said anvil plates being mounted on the opposite side of said path.

9. The apparatus of claim 8 wherein each of said circular cams and said breaker wheel are drivingly connected to power sources and are rotated in a direction to move the portions thereof adjacent to said path in said given direction.

* * * * *

UNITED STATES PATENT OFFICE
CERTIFICATE OF CORRECTION

Patent No. 4,291,434      Dated September 29, 1981

Inventor(s) Tom Batts

It is certified that error appears in the above-identified patent and that said Letters Patent are hereby corrected as shown below:

Column 3, line 35, cancel "7/8" and substitute therefor --5/8--.

Signed and Sealed this

Twenty-ninth Day of December 1981

[SEAL]

*Attest:*

*Attesting Officer*

GERALD J. MOSSINGHOFF

*Commissioner of Patents and Trademarks*